July 21, 1964   V. DI MAIO ETAL   3,141,809
MINERAL FIBER LAMINATE AND METHOD OF MAKING SAME
Filed June 26, 1957   2 Sheets-Sheet 1
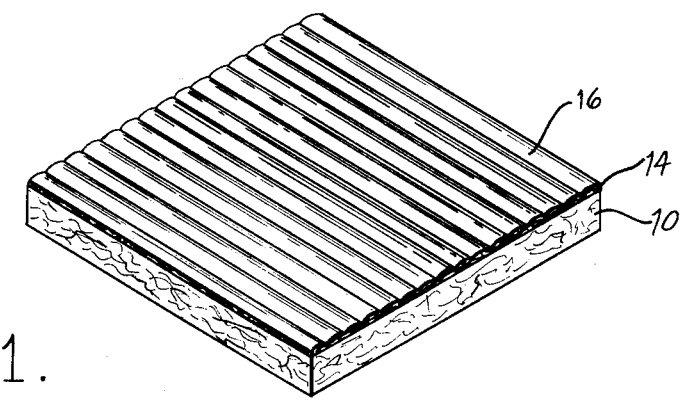
Fig. 1.
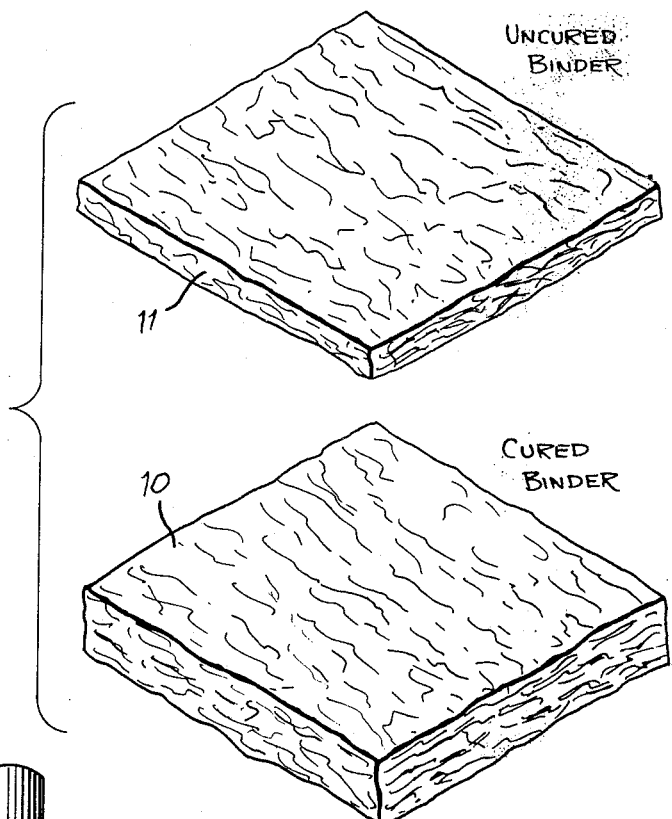
Fig. 2.
Fig. 3.
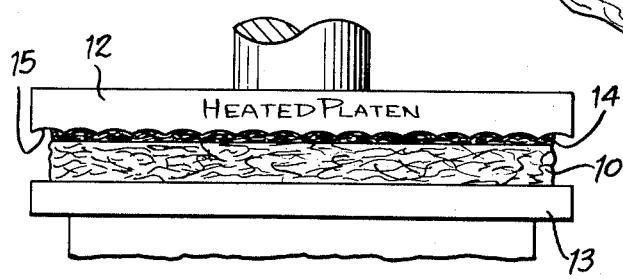
INVENTORS
VINCENT DI MAIO
NORMAN T. MILLER
BY
John A. McKinney
ATTORNEY

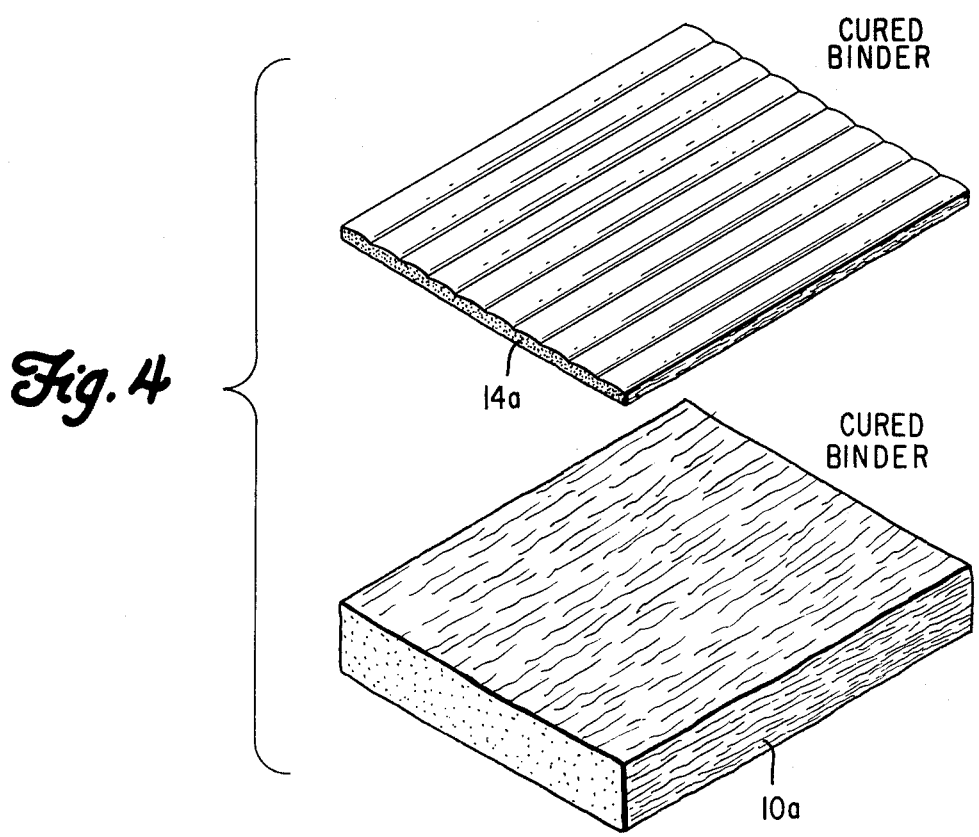
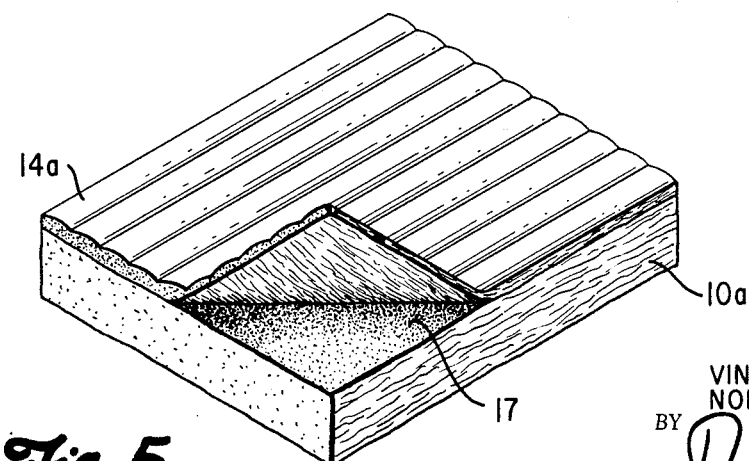

3,141,809
MINERAL FIBER LAMINATE AND METHOD OF MAKING SAME
Vincent Di Maio and Norman T. Miller, Toledo, Ohio, assignors, by mesne assignments, to Johns-Manville Fiber Glass Inc., Cleveland, Ohio, a corporation of Delaware
Filed June 26, 1957, Ser. No. 668,071
10 Claims. (Cl. 161—73)

This invention relates to mineral fiber material of glass or rock wool and also to a method of producing same.

Mineral wool is usually made into blankets or mats with the fibers arranged haphazardly and of a suitable depth and density. In order to obtain a cohesive mass, the fibers are treated with a binder, for example phenol formaldehyde which produces a tan colored end product or melamine in the case where a white end product is desired, and thereafter, the mass is cured usually under heat. A relatively resilient mass is thus formed which is cohesive or self-sustaining but due to the nature of the fibers, a blanket or mat of this character at low densities is very flexible, and, for certain purposes, its use is quite limited. For example, for acoustical work involving tile or acoustical board, a blanket or mat of this character cannot be used unless a high density product is desired. Likewise for certain insulating purposes requiring special shape as for example insulating jackets for T or Y joints, the blanket alone is unsatisfactory.

An object is to produce an unwoven porous laminate of mineral fibers which is relatively rigid and self-sustaining and can be formed in different shapes and still retain properties of insulating both thermally and acoustically and is formed with a relatively hard skin or layer admirably adapted due to its high density for receiving paint and still retain the desired acoustical porosity and resilience along with high tensile strength.

Another object is to produce an unwoven fiber material which is bonded by a thermosetting plastic material and has a high density thin skin or outer layer on one or both sides affording rigid characteristics and a relatively thick porous resilient body which can be flexed to approximately 180°, and can be produced economically on a large quantity basis.

A further object is to produce an unwoven fiber material in thick sheets or rolls, the fibers of which are bonded by a thermosetting resin, and which has a high density thin skin integrally bonded to it and embossed or shaped to a predetermined contour or design or in perfectly flat condition without a long time required to necessarily cure a thick mass.

A still further object is to produce a simple and efficient method of producing mineral fiber material of the above character.

Other objects and advantages will hereinafter appear and for purposes of illustration but not of limitation, an embodiment of the invention is shown on the accompanying drawings in which FIGURE 1 is a top perspective view of an acoustical tile which has a relatively rigid skin embossed for strength purposes and a body of relatively flexible resilient fibers suitably bonded together to produce a coherent mass;

FIGURE 2 is a composite view showing a piece of the uncured mineral fibrous material and the body portion of the cured fibrous material prior to being united;

FIGURE 3 is a fragmentary view showing a means by which the uncured fibrous material is cured and simultaneously adhered to the cured fibrous material;

FIGURE 4 is a composite perspective view showing an alternate method of forming the laminate from preformed components; and FIGURE 5 is a perspective view of the laminate according to FIGURE 4 showing the adhesive for securing together the plies.

The illustrated embodiment of the invention shown in FIGURE 1 is an acoustical tile having a body portion or core 10 of mineral fibers, such as glass or rock wool, bonded together by suitable binder of suitable thermosetting material, such for example a phenol-formaldehyde, urea-formaldehyde, melamine, dicyandiamide, or a polyester resin, or any combination of these materials, and cured, thereby forming a relatively flexible and resilient body of a predetermined density. The core 10 is of an unwoven, porous mass of fibers which are arranged generally in a plane parallel to the two major dimensions of the body, i.e., the length and width thereof. The fibers of the core are of a diameter of from .00010″ to .00015″, relatively short in length, as for example from one to four inches and are disposed generally in parallel relationship to each other which produces a high tensile strength and adds to the rigidity. To one or both of the outer surfaces of this core is a relatively rigid molded skin or thin outer layer 14, the fiber diameter of which also has the range of .00010″ to .00015″ and the same order of fiber length, and which in this instance has a series of parallel ridges or embossments 16 which enhance the strength and rigidity of the tile and also add a decorative effect. Manifestly the embossment may be changed as desired to create almost any effect, and since this can be achieved at the time the skin 14 is formed and adhered to the body, no additional expense is involved.

Particularly in connection with acoustical boards which in their popular size are of the order of two feet by four feet, the fibers should extend generally the short dimension of the board, thereby to enhance the rigidity of the structure and militate against sagging when installed in position of use, in ceilings for example where they are supported only around their periphery. This is particularly important because of the relatively low density and flexibility of the core of the boards, the density being approximately in the range of four pounds per cubic foot or under, and preferably between ½ pound to 2½ pounds per cubic foot, it being understood that one side thereof is faced by a layer or skin of high density as above described. As above indicated, both sides may if desired be faced with high density skins and this will enhance the rigidity of the laminate.

It will thus be manifest that a low weight laminate is produced in which the core 10 of mineral fibers suitably bonded together is relatively flexible (capable of flexure through 180°) and resilient and an outer layer or skin of high density of the order of six to sixteen pounds per cubic foot, and preferably about 8 pounds per cubic foot, forming a flexible crust-like exterior, a desirable thickness for the skin being of the order of 1/32″ to 1/16″, as compared to the approximately one inch or greater of the core. Thus the skin of high density and/or the thickness of the board adds rigidity to the material and the union between the core 10 and the skin 14 or the high density layer is such definitely to resist separation and for all practical purposes a unitary structure is produced. The diameter and length of the fibers of the core and the skin are within the same range as above indicated.

FIGURE 3 illustrates a means by which the laminate is produced. As shown, there is an upper platen 12 heated in any suitable manner, which is movable toward and away from a stationary lower platen 13. On the lower platen is placed the body 10 which consists of mineral fibers coated with a thermosetting binder and precured. Thermosetting materials such as above mentioned, are employed as a binder because they withstand approximately 500° F. without becoming soft or fluid and this is desirable to produce an economical process since a 500° F. temperature reduces the curing time to approximately five seconds. The percentage of binder introduced into the body of fibers is between 15% and 25% by weight of the body and this may be applied either by spraying the binder in a fluid state or by powder form or both. The greater amount of binder employed, the greater will be the rigidity. It is important that the plastic binder withstand a temperature of from 450° F. to 500° F. in order to pass the fire underwriter's test but these binders can be cured at lower temperatures for a longer time, viz. a temperature of 250° F. for ten minutes and have the following characteristics: no odor, moisture resistant; resistant to weak alkalis and acids; have reasonable tensile strength; and fire resistant. Placed on top of the precured core 10 is a layer of mineral fibers sprayed or otherwise coated with 15% to 25% by weight of a thermosetting binder but uncured. The specific thermosetting binder used for this purpose is any one of the above mentioned binders or mixtures thereof. The thickness of the layer 11 of the uncured material is predetermined to achieve the desired rigidity of the resulting laminate. Thereafter the heated platen 12 is lowered against the stationary platen 13, thereby compressing the mass. The pressure applied in this manner determines the thickness and density of the skin, the greater the pressure the greater the density and the smaller the thickness. A heat of the order of 400° F. for a period of approximately ten seconds is sufficient to effect the curing of the skin layer and simultaneously to adhere it to the body 10 so that when the platens are separated the skin 11 is relatively thin, rigid and satisfactorily adhered to the body 10. If desired, carnauba wax or other suitable material may be used as a parting agent between the layer 11 and the heated platen. Furthermore the heated platen may be formed in any suitable way to effect an embossing of the skin 11. For example, the ridges 16 may be formed as shown in FIGURE 1, and this not only adds to the decorative effect but also adds to the rigidity of the material. Numerous designs can be thus imparted to the skin layer 11 without increasing the cost.

It will be apparent from the above that when the platens of the press are opened, the uncured material 11 is cured into a high density thin sheet or skin of glass in the case of glass fibers and at the same time bonds it to the cured resilient layer 10 which then springs out to its normal thickness.

If desired, the skin 14a can be produced separately from the core and, as indicated on FIGURE 4, the fibers may be of random lengths and disposed generally in parallel relationship. Thus before the skin 14a is applied to the core 10a, its binder is cured by following the method above described requiring pressure and heat. For securing the skin 14a to the core 10a, a suitable adhesive 17, such as a thermosetting resin as used in the core or skin or any moisture resistant high temperature adhesive, may be employed. The fibers of the core are as above described, preferably of short lengths and in generally parallel relationship. This enables the skin as well as the core to be in large rolls or sheets which enable superimposition and adhesion in a simple, practical manner which lends itself admirably to large scale production. This provides a laminate of the desired characteristics, such as high density outer ply or skin, a core of low density, porosity, flexibility and resilience.

One important use of the above material is for acoustical purposes, such as ceiling board and tile. The skin or outer ply provides a surface to which paint will adhere and because of the nature of the surface, a relatively small amount of paint is required to cover it and still maintain acoustical porosity while producing exceptionally high light reflection. No prime or sealer coats for painting are necessary. The paint may be applied either by a spray gun or a roller thereby reducing the cost of painting. The relatively rigid skin also provides a smooth surface to which vinyl plastic may be applied, thereby enabling the laminate to be used quite satisfactorily as upholstery covering for furniture, automobile acoustical roof linings or other decorative applications. By providing suitable molds to receive the uncured material as well as the cured core different shapes, such as covering for Y or T pipe joints, can be produced satisfactorily. The melamine binder or dicyandiamide above mentioned can be used to advantage as the skin layer to produce a white background for painting. If desired, the mold can be paint sprayed before the molding operation.

This application constitutes a continuation-in-part of our application, Serial No. 628,923, filed December 17, 1956, now abandoned, and entitled Mineral Wool Laminate and Method of Making Same.

What we claim is:

1. A fibrous laminate comprising a first resilient layer of individual glass fibers arranged generally in parallel relation bonded one to another by a cured thermosetting resin and having voids therebetween, and an adjacent layer of greater density and rigidity integrally joined therewith formed of individual discontinuous glass fibers bonded one to another at their intersections and having voids therebetween, the density of said first layer being between about one-half and about four pounds per cubic foot and the density of said second layer being between about six and about sixteen pounds per cubic foot.

2. A fibrous laminate as defined in claim 1 wherein the thermosetting resin is present in an amount between about fifteen and twenty-five percent by weight.

3. A fibrous laminate as defined in claim 1 wherein the fibers have a diameter in the range of 0.00010 and 0.00015 inch.

4. A fibrous laminate as defined in claim 1 wherein said higher density layer has an embossed surface.

5. A method of forming a glass fiber laminate having adjacent layers of different densities comprising, placing in contact with a first fibrous layer of individual mineral fibers arranged in a generally parallel relation bonded one to another by cured thermosetting resin binder a fibrous mass forming a second layer of individual glass fibers bonded by uncured thermosetting resin binder and having voids therebetween, and applying heat and pressure to said layers while in contact to compress said second layer to a density higher than the original density of said second layer and different from the density of said first layer, to bond the second fibrous layer to said first fibrous layer, and to bond said fibers of said second layer one to another at their intersections.

6. A method as defined in claim 5 wherein said second fibrous layer has an initial density lower than the density of the first fibrous layer and is compressed to a density higher than the density of said first fibrous layer.

7. A method of producing a mineral wool laminate comprising, providing a porous mat of mineral fibers arranged generally in parallel relation adhered by cured thermosetting resin binder to provide a flexible resilient mat capable of 180° flexure, applying in direct contact to the surface of said mat a layer of mineral fibers bonded at their intersections by uncured thermosetting resin binder, and applying heat and pressure to the thus formed laminate to compress said layer to a density higher than that originally possessed by said layer, to bond the fibers of said mineral wool layer inter se, and to bond said layer to said porous mat.

8. A method as defined in claim 7 wherein said layer is embossed during the application of heat and pressure.

9. A method as defined in claim 7 wherein the porous mat has a density between one-half and four pounds per cubic foot and said layer is compressed and set to a density of between about six and sixteen pounds per cubic foot.

10. A method of manufacturing a fibrous glass product comprising the steps of:

(a) providing a porous mass of interfelted discontinuous glass fibers having between 15 and 25% by weight of an uncured resin binder distributed therethrough, (b) assembling therewith a second mass of glass fibers arranged generally in parallel relation interbonded by between 15 to 25% by weight of a cured resin binder distributed therethrough, said mass having a density of between ½ to 4 pounds per cubic foot, (c) compressing said assembled masses into tight association, and (d) heating the compressed masses to cure the heat curable resin to interbond the glass fibers therein and provide for said porous mass a density of between 6 and 16 pounds per cubic foot.

References Cited in the file of this patent

UNITED STATES PATENTS

| | | |
|---|---|---|
| 2,124,086 | Slidell | July 19, 1938 |
| 2,305,516 | Coss et al. | Dec. 15, 1942 |
| 2,339,431 | Slayter | Jan. 18, 1944 |
| 2,393,947 | Ximenez | Jan. 29, 1946 |
| 2,550,465 | Gorski | Apr. 24, 1951 |
| 2,552,124 | Tallman | May 8, 1951 |
| 2,612,462 | Zettel | Sept. 30, 1952 |
| 2,694,025 | Slayter et al. | Nov. 9, 1954 |
| 2,744,044 | Toulmin | May 1, 1956 |
| 2,760,881 | Toulmin | Aug. 28, 1956 |
| 2,868,684 | Labino | Jan. 13, 1959 |
| 2,881,110 | Walker et al. | Apr. 7, 1959 |
| 2,938,737 | Walker | May 31, 1960 |